(12) United States Patent
Segal et al.

(10) Patent No.: US 11,914,614 B2
(45) Date of Patent: Feb. 27, 2024

(54) SYSTEM AND METHOD FOR GENERATING A COLLECTION OF APPROXIMATELY COORDINATED REGION MAPS

(71) Applicant: RESIGHT LTD., Tel Aviv-Jaffa (IL)

(72) Inventors: Eran Segal, Tel Aviv-Jaffa (IL); Ari Zigler, Elkana (IL); Omri Yaakov Stein, Tel Aviv-Jaffa (IL)

(73) Assignee: RESIGHT LTD., Tel Aviv—Yafo (IL)

( * ) Notice: Subject to any disclaimer, the term of this patent is extended or adjusted under 35 U.S.C. 154(b) by 177 days.

(21) Appl. No.: 17/261,901

(22) PCT Filed: Aug. 1, 2019

(86) PCT No.: PCT/IL2019/050868
§ 371 (c)(1),
(2) Date: Jan. 21, 2021

(87) PCT Pub. No.: WO2020/026246
PCT Pub. Date: Feb. 6, 2020

(65) Prior Publication Data
US 2021/0256034 A1    Aug. 19, 2021

Related U.S. Application Data

(60) Provisional application No. 62/713,550, filed on Aug. 2, 2018.

(51) Int. Cl.
*G06F 16/27* (2019.01)
*G06F 16/23* (2019.01)
*G06F 16/29* (2019.01)

(52) U.S. Cl.
CPC .......... *G06F 16/27* (2019.01); *G06F 16/2379* (2019.01); *G06F 16/273* (2019.01);
(Continued)

(58) Field of Classification Search
CPC ...... G06F 16/27; G06F 16/2379; G06F 16/29; G06F 16/273; G06F 16/275; G06F 16/278
See application file for complete search history.

(56) References Cited

U.S. PATENT DOCUMENTS

8,839,121 B2    9/2014  Bertolami et al.
9,754,397 B1    9/2017  Piemonte
(Continued)

*Primary Examiner* — Kris E Mackes
*Assistant Examiner* — Lin Lin M Htay (57) ABSTRACT

A system for generating approximately coordinated region maps (RM), the system comprising a processing resource configured to: provide a data repository comprising one or more RMs, each mapping a corresponding region, and each including information of a relative location of synchronization objects (SOs) located within the corresponding region with respect to a coordinate-system (CS) origin of a CS of the corresponding RM; obtain a given RM including information of relative locations of given SOs located within the given region with respect to a given CS origin of a given CS of the given RM; retrieve, from the data repository, reference RMs that meet a criteria; identify the reference RMs associated with at least one SO that match at least one of the given SO, giving rise to optimization RMs; and determine, utilizing an optimization scheme, an approximate transformation between the given CS and the CSs of the optimization RMs.

20 Claims, 4 Drawing Sheets

(52) U.S. Cl.
CPC .......... *G06F 16/275* (2019.01); *G06F 16/278* (2019.01); *G06F 16/29* (2019.01)

(56) References Cited

U.S. PATENT DOCUMENTS

| | | |
|---|---|---|
| 2013/0194304 A1 | 8/2013 | Latta et al. |
| 2016/0026253 A1 | 1/2016 | Bradski et al. |
| 2017/0046878 A1 | 2/2017 | Dobslaw |
| 2017/0185823 A1* | 6/2017 | Gold .................... G06T 19/006 |
| 2018/0005450 A1 | 1/2018 | Daniels et al. |
| 2018/0023961 A1* | 1/2018 | Fridman .................. G06T 7/37 382/104 |
| 2018/0120116 A1 | 5/2018 | Rombouts et al. |
| 2018/0188043 A1* | 7/2018 | Chen ...................... G06T 7/593 |
| 2019/0301873 A1* | 10/2019 | Prasser .................... G06T 7/74 |

* cited by examiner

SYSTEM AND METHOD FOR GENERATING A COLLECTION OF APPROXIMATELY COORDINATED REGION MAPS

TECHNICAL FIELD

The invention relates to a system and method for generating a collection of approximately coordinated region maps.

BACKGROUND

Many devices (including mobile devices, such as mobile phones, laptops, tablets, smart watches, or any other mobile device having data processing capabilities) and/or applications operating on such devices, utilize a device-specific coordinate system (also referred to herein as "local coordinate system"), having a certain coordinate system origin. Therefore, a first device/application may operate using a first coordinate system, having a first coordinate system origin, a second device may operate using a second coordinate system, having a second coordinate system origin other than the first coordinate system origin, and so on and so forth.

In some cases, each device can generate one or more maps of regions (referred to herein as: "Region Maps", while a region is a certain geographical area mapped by the corresponding device), using the device's coordinate system and geographic information determined/obtained by the device. Each of the region maps can include information of a relative location of one or more synchronization objects located within the corresponding region with respect to a coordinate-system origin of a coordinate system of the corresponding region map. The coordinate-system origin of the coordinate system of the corresponding region map is determined by the device that generates it.

Assuming that a plurality of devices, each generates one or more region maps, mapping a geographical area that at least partially overlaps between such region maps, due to the fact that the coordinate-system origin of the coordinate system of each of such region maps is determined by the device that generated it, and due to the fact that the devices geographical positioning capabilities have limited accuracy, coordinates of a given synchronization object in a first region map generated by a first device may differ from coordinates of the same given synchronization object in a second region map generated by a second device.

Therefore, there is a need for a new system and method for generating a collection of approximately coordinated region maps.

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 8,839,121 (Bertolami et al.) published on Sep. 16, 2014, discloses Systems and methods for unifying coordinate systems in an augmented reality application or system are disclosed. User devices capture an image of a scene, and determine a location based on the scene image. The scene image may be compared to cartography data or images to determine the location. User devices may propose an origin and orientation or transformation data for a common coordinate system and exchange proposed coordinate system data to agree on a common coordinate system. User devices may also transmit location information to an augmented reality system that then determines a common coordinate system and transmits coordinate system data such as transformation matrices to the user devices. Images presented to users may be adjusted based on user device locations relative to the coordinate system.

US Patent Application No. 2013/0194304 (Letta et al.) published on Aug. 1, 2013, discloses a method for presenting real and virtual images correctly positioned with respect to each other. The method includes, in a first field of view, receiving a first real image of an object and displaying a first virtual image. The method also includes, in a second field of view oriented independently relative to the first field of view, receiving a second real image of the object and displaying a second virtual image, the first and second virtual images positioned coincidently within a coordinate system.

US Patent Application No. 2018/0005450 (Daniels et al.) published on Jan. 4, 2018, discloses a system for accurately positioning augmented reality (AR) content within a coordinate system such as the World Geodetic System (WGS) may include AR content tethered to trackable physical features. As the system is used by mobile computing devices, each mobile device may calculate and compare relative positioning data between the trackable features. The system may connect and group the trackable features hierarchically, as measurements are obtained. As additional measurements are made of the trackable features in a group, the relative position data may be improved, e.g., using statistical methods.

US Patent Application No. 2016/0026253 (Bradski et al.) published on Jan. 28, 2016, discloses configurations for presenting virtual reality and augmented reality experiences to users. The system may comprise an image capturing device to capture one or more images, the one or more images corresponding to a field of the view of a user of a head-mounted augmented reality device, and a processor communicatively coupled to the image capturing device to extract a set of map points from the set of images, to identify a set of sparse points and a set of dense points from the extracted set of map points, and to perform a normalization on the set of map points.

U.S. Pat. No. 9,754,397 (Piemonte et al.) published on Sep. 5, 2017, discloses methods, hardware, and software perform augmented reality created from a separate source in context with, such as synchronized and positioned in, captured media, so as to replicate a similar augmented reality at a different instance. A computer processor in a network of communications devices handles a combination of augmented reality information, anchor information that provides the context-matching, limitation information that controls if such information is transmitted or acted upon, and captured media information. The computer processor compares the anchor information with the media to identify triggering media and how augmented reality elements should appear in context with such media. If successful, the augmented reality is performed on a communications device based on the media. Augmented reality can thus be performed in strict reference to actually-captured media, in only desired or restricted conditions, and information transmission and processing to enable the same may be undertaken only at useful, resource-conserving instances.

US Patent Application No. 2017/0046878 (Dobslaw) published on Feb. 16, 2017, discloses a mobile device computationally locates a three-dimensional virtual object model at a first virtual location corresponding to a first geographical location; computationally orients the three-dimensional virtual object model at a first virtual orientation; determines a real location and real orientation of the mobile device over time; captures real world image data over time; and displays over time an augmented reality view including the real world image data and the three-dimensional virtual object model in the first virtual location and first virtual orientation from a correct perspective of the mobile device based on the determined real location and real orientation of the mobile device. The correct perspective varies as the mobile device is relocated and reoriented over time by movement.

GENERAL DESCRIPTION

In accordance with a first aspect of the presently disclosed subject matter, there is provided a system for generating a collection of approximately coordinated region maps, the system comprising one or more processing resources configured to perform the following process: provide a data repository comprising one or more region maps, each of the region maps mapping a corresponding region, wherein each of the region maps includes information of a relative location of one or more synchronization objects located within the corresponding region with respect to a coordinate-system origin of a coordinate system of the corresponding region map; obtain a given region map of a given region, the given region map includes second information of second relative locations of one or more given synchronization objects located within the given region with respect to a given coordinate-system origin of a given coordinate system of the given region map; retrieve, from the data repository, one or more reference region maps of the region maps that meet a criteria; identify the reference region maps associated with at least one first synchronization object of the synchronization objects that match to at least one of the given synchronization objects, giving rise to optimization region maps; and determine, by employing an optimization scheme, utilizing the information of the relative location of the synchronization objects of the optimization region maps and the second information of the second relative locations of the given synchronization objects, an approximate transformation between the given coordinate-system and the coordinate-systems of the optimization region maps.

In some cases, at least one of the processing resources is further configured to repeatedly perform the following: update the given region map by adding third information of third relative locations of one or more additional synchronization objects located within the given region with respect to the given coordinate-system origin of the given coordinate system of the given region map; identify the reference region maps associated with the at least one first synchronization object of the synchronization objects that match to at least one of the additional synchronization objects, giving rise to additional optimization region maps; and re-determine, by employing the optimization scheme, utilizing the information of the relative location of the synchronization objects of the optimization region maps, the second information of the second relative locations of the given synchronization objects, and the third information of third relative locations of one or more additional synchronization objects, an optimized approximate transformation between the given coordinate-system and the coordinate-systems of the optimization region maps and the additional optimization region maps.

In some cases, the criteria is one or more of the following: at least a partial overlap exists between the reference region maps and the given region map; the reference region maps are associated with geographical data that is indicative that at least one first coordinate covered by the reference region maps is within a threshold distance of at least one second coordinate covered by the given region map; and the reference region maps are generated by a user device of at least one user located within a second threshold distance of a second user device, wherein the second user device generated the given region map.

In some cases, the at least one first synchronization object is determined to match the at least one of the given synchronization objects upon uniquely identifying that the at least one first synchronization object and the at least one of the given synchronization objects are a same object having a common unique identifier.

In some cases, the at least one first synchronization object is determined to match the at least one of the given synchronization objects upon a likelihood of the at least one first synchronization object matching the at least one of the given synchronization objects being above a threshold.

In some cases, the optimization scheme is based on one or more of the following: Non-linear regression; Non-linear Least Squares Optimization; Non-linear programming; Bayesian estimation; and Linear quadratic estimation.

In some cases, the given region map is one of a plurality of session region maps generated during a session, wherein each of the session region maps is associated with a distinct session region map coordinate-system origin, thereby enabling determining a second transformation between the respective session region map's coordinate system and the coordinate-systems of the respective session region map's respective optimization region maps.

In some cases, at least one of the given synchronization objects and at least one of the synchronization objects, is at least one of the following: a collection of objects having a first spatial relationship therebetween; a pattern; a three-vector point in a three-dimensional space; a Global Positioning System (GPS) measurement; a point cloud; a semantically identified object; a plane; a collection of at least two planes having a second spatial relationship therebetween; a uniquely identifiable object; a uniquely identifiable image; a uniquely identifiable synchronization object received from an external third party or from an operating system of a user device; and a projection of feature points onto a sphere and/or a cube positioned in a spatial location in the region map.

In some cases, upon any one of the synchronization objects being the semantically identified object semantically identified as being of a given type, the processing resource is further configured to delete the corresponding synchronization object from the data repository.

In some cases, at least one of the processing resources is a user device processing resource, and wherein at least part of the process is performed by the user device processing resource.

In some cases, the given region map is generated using information obtained by the user's device.

In some cases, the given region map is retrieved from another user's device.

In some cases, at least one of the processing resources is a server processing resource, and wherein at least part of the process is performed by the server processing resource.

In some cases, the given region map is retrieved from the data repository.

In some cases, at least one of the processing resources is further configured to reposition, utilizing the approximate transformation, at least one of the synchronization objects of the optimization region maps based on a position of its corresponding given synchronization object, or reposition at least one of the given synchronization objects of the given region map based on a position of its corresponding synchronization object as indicated by the optimization region maps.

In some cases, one or more of the synchronization objects and one or more of the given synchronization objects are associated with respective movability scores, and wherein the repositioning is based on the movability scores, wherein the movability scores are indicative of a likelihood of a change in the spatial disposition of the respective given synchronization object and the respective synchronization objects, over time.

In some cases, one or more of the synchronization objects and one or more of the given synchronization objects are associated with respective accuracy scores, and wherein the repositioning is based on the accuracy scores, wherein the accuracy scores are indicative of a presumed accuracy of the spatial disposition of the respective given synchronization objects and the respective synchronization objects.

In some cases, at least one if the processing resources is further configured to merge one or more selected region maps of the region maps into a merged region map upon a determination that a level of similarity between positions of the synchronization objects of the selected region maps exceeds a threshold.

In some cases, the given region map includes information about virtual anchors generated by one or more users of the system.

In some cases, the virtual anchors include information about virtual content registered by the users.

In some cases, the virtual anchors are stored on the data repository.

In accordance with a second aspect of the presently disclosed subject matter, there is provided a method of generating a collection of approximately coordinated region maps, the method comprising performing the following process: providing a data repository comprising one or more region maps, each of the region maps mapping a corresponding region, wherein each of the region maps includes information of a relative location of one or more synchronization objects located within the corresponding region with respect to a coordinate-system origin of a coordinate system of the corresponding region map; obtaining, by one or more processing resources, a given region map of a given region, the given region map includes second information of second relative locations of one or more given synchronization objects located within the given region with respect to a given coordinate-system origin of a given coordinate system of the given region map; retrieving, by at least one of the processing resources, from the data repository, one or more reference region maps of the region maps that meet a criteria; identifying, by at least one of the processing resources, the reference region maps associated with at least one first synchronization object of the synchronization objects that match to at least one of the given synchronization objects, giving rise to optimization region maps; and determining, by at least one of the processing resources, by employing an optimization scheme, utilizing the information of the relative location of the synchronization objects of the optimization region maps and the second information of the second relative locations of the given synchronization objects, an approximate transformation between the given coordinate-system and the coordinate-systems of the optimization region maps.

In some cases, the method further comprises repeatedly performing the following: updating, by at least one of the processing resources, the given region map by adding third information of third relative locations of one or more additional synchronization objects located within the given region with respect to the given coordinate-system origin of the given coordinate system of the given region map; identifying, by at least one of the processing resources, the reference region maps associated with the at least one first synchronization object of the synchronization objects that match to at least one of the additional synchronization objects, giving rise to additional optimization region maps; and re-determining, by at least one of the processing resources, by employing the optimization scheme, utilizing the information of the relative location of the synchronization objects of the optimization region maps, the second information of the second relative locations of the given synchronization objects, and the third information of third relative locations of one or more additional synchronization objects, an optimized approximate transformation between the given coordinate-system and the coordinate-systems of the optimization region maps and the additional optimization region maps.

In some cases, the criteria is one or more of the following: at least a partial overlap exists between the reference region maps and the given region map; the reference region maps are associated with geographical data that is indicative that at least one first coordinate covered by the reference region maps is within a threshold distance of at least one second coordinate covered by the given region map; and the reference region maps are generated by a user device of at least one user located within a second threshold distance of a second user device, wherein the second user device generated the given region map.

In some cases, the at least one first synchronization object is determined to match the at least one of the given synchronization objects upon uniquely identifying that the at least one first synchronization object and the at least one of the given synchronization objects are a same object having a common unique identifier.

In some cases, the at least one first synchronization object is determined to match the at least one of the given synchronization objects upon a likelihood of the at least one first synchronization object matching the at least one of the given synchronization objects being above a threshold.

In some cases, the optimization scheme is based on one or more of the following: Non-linear regression; Non-linear Least Squares Optimization; Non-linear programming; Bayesian estimation; and Linear quadratic estimation.

In some cases, the given region map is one of a plurality of session region maps generated during a session, wherein each of the session region maps is associated with a distinct session region map coordinate-system origin, thereby enabling determining a second transformation between the respective session region map's coordinate system and the coordinate-systems of the respective session region map's respective optimization region maps.

In some cases, at least one of the given synchronization objects and at least one of the synchronization objects, is at least one of the following: a collection of objects having a first spatial relationship therebetween; a pattern; a three-vector point in a three-dimensional space; a Global Positioning System (GPS) measurement; a point cloud; a semantically identified object; a plane; a collection of at least two planes having a second spatial relationship therebetween; a uniquely identifiable object; a uniquely identifiable image; a uniquely identifiable synchronization object received from an external third party or from an operating system of a user device; and a projection of feature points onto a sphere and/or a cube positioned in a spatial location in the region map.

In some cases, upon any one of the synchronization objects being the semantically identified object semantically identified as being of a given type, the processing resource is further configured to delete the corresponding synchronization object from the data repository.

In some cases, at least one of the processing resources is a user device processing resource, and wherein at least part of the process is performed by the user device processing resource.

In some cases, the given region map is generated using information obtained by the user's device.

In some cases, the given region map is retrieved from another user's device.

In some cases, at least one of the processing resources is a server processing resource, and wherein at least part of the process is performed by the server processing resource.

In some cases, the given region map is retrieved from the data repository.

In some cases, the method further comprises repositioning, by at least one of the processing resources, utilizing the approximate transformation, at least one of the synchronization objects of the optimization region maps based on a position of its corresponding given synchronization object, or reposition at least one of the given synchronization objects of the given region map based on a position of its corresponding synchronization object as indicated by the optimization region maps.

In some cases, one or more of the synchronization objects and one or more of the given synchronization objects are associated with respective movability scores, and wherein the repositioning is based on the movability scores, wherein the movability scores are indicative of a likelihood of a change in the spatial disposition of the respective given synchronization object and the respective synchronization objects, over time.

In some cases, one or more of the synchronization objects and one or more of the given synchronization objects are associated with respective accuracy scores, and wherein the repositioning is based on the accuracy scores, wherein the accuracy scores are indicative of a presumed accuracy of the spatial disposition of the respective given synchronization objects and the respective synchronization objects.

In some cases, the method further comprises merging, by at least one of the processing resources, one or more selected region maps of the region maps into a merged region map upon a determination that a level of similarity between positions of the synchronization objects of the selected region maps exceeds a threshold.

In some cases, the given region map includes information about virtual anchors generated by one or more users of the system.

In some cases, the virtual anchors include information about virtual content registered by the users.

In some cases, the virtual anchors are stored on the data repository.

In accordance with a third aspect of the presently disclosed subject matter, there is provided a non-transitory computer readable storage medium having computer readable program code embodied therewith, the computer readable program code, executable by at least one processor of a computer to perform a method of generating a collection of approximately coordinated region maps, the method comprising performing the following process: providing a data repository comprising one or more region maps, each of the region maps mapping a corresponding region, wherein each of the region maps includes information of a relative location of one or more synchronization objects located within the corresponding region with respect to a coordinate-system origin of a coordinate system of the corresponding region map; obtaining, by one or more processing resources, a given region map of a given region, the given region map includes second information of second relative locations of one or more given synchronization objects located within the given region with respect to a given coordinate-system origin of a given coordinate system of the given region map; retrieving, by at least one of the processing resources, from the data repository, one or more reference region maps of the region maps that meet a criteria; identifying, by at least one of the processing resources, the reference region maps associated with at least one first synchronization object of the synchronization objects that match to at least one of the given synchronization objects, giving rise to optimization region maps; and determining, by at least one of the processing resources, by employing an optimization scheme, utilizing the information of the relative location of the synchronization objects of the optimization region maps and the second information of the second relative locations of the given synchronization objects, an approximate transformation between the given coordinate-system and the coordinate-systems of the optimization region maps.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "obtaining", "retrieving", "identifying", "determining", "repositioning", "updating", "re-determining", "merging", or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 3:
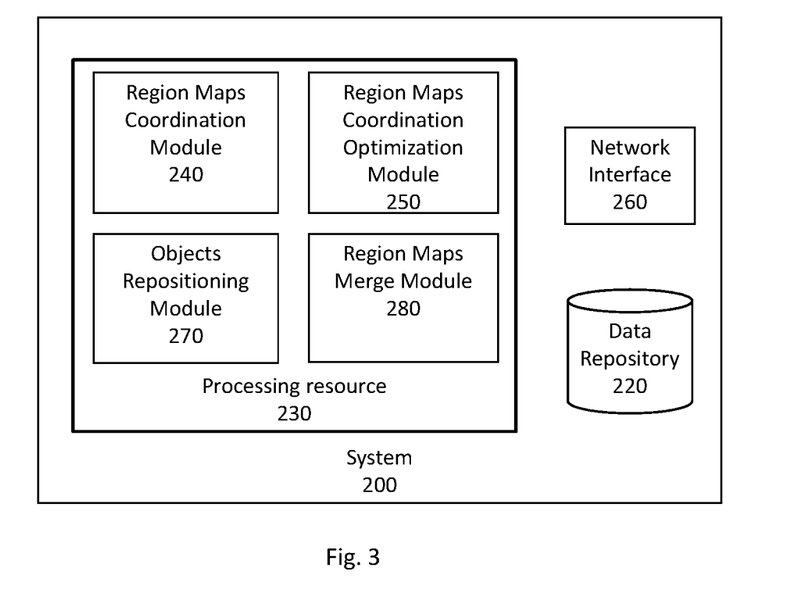
FIG. 3 is a block diagram schematically illustrating one example of a system for generating a collection of approximately coordinated region maps, in accordance with the presently disclosed subject matter.
Figure 4:
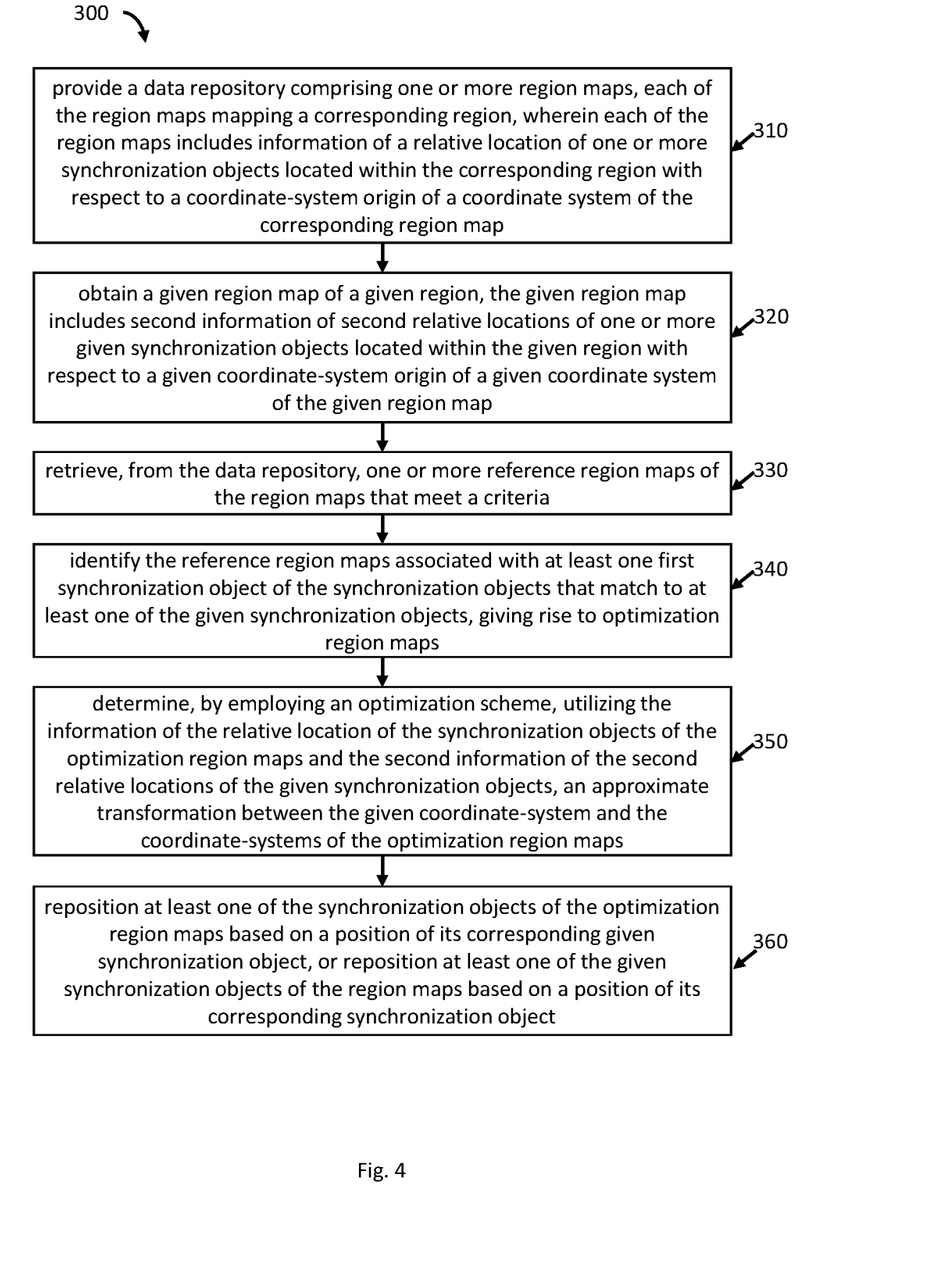
FIG. 4 is a flowchart illustrating one example of a sequence of operations carried out for determining an approximate transformation between a coordinate system of a given region map and coordinate systems of other region maps, in accordance with the presently disclosed subject matter.
Figure 5:
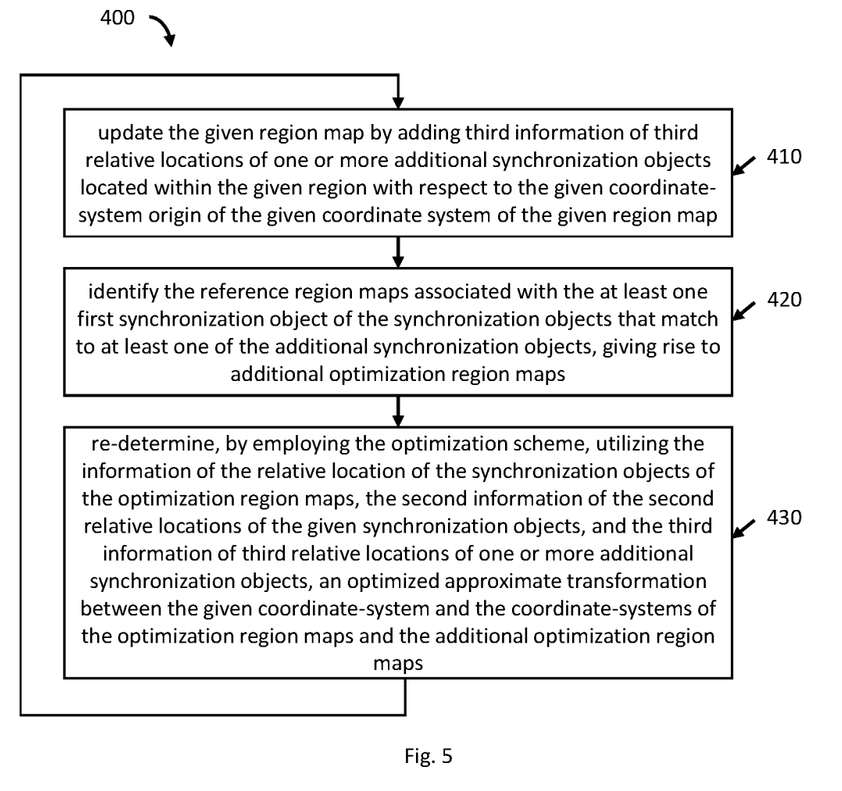
FIG. 5 is a flowchart illustrating one example of a sequence of operations carried out for re-determining an approximate transformation between a coordinate system of a given region map and coordinate systems of other region maps, in accordance with the presently disclosed subject matter.
Figure 6:
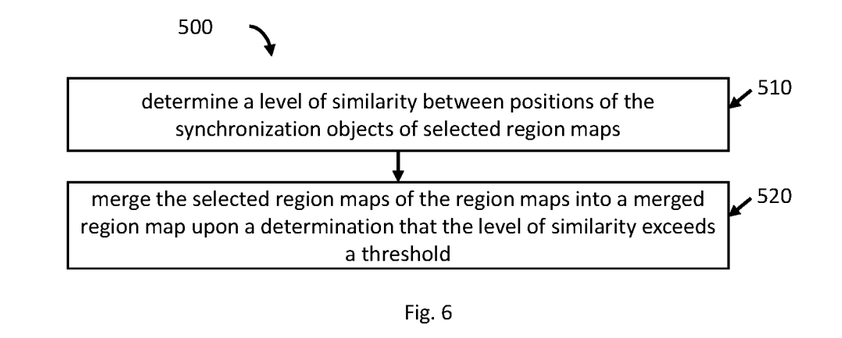
FIG. 6 is a flowchart illustrating one example of a sequence of operations carried out for merging region maps, in accordance with the presently disclosed subject matter.

In embodiments of the presently disclosed subject matter, fewer, more and/or different stages than those shown in FIGS. 4-6 may be executed. In embodiments of the presently disclosed subject matter one or more stages illustrated in FIGS. 4-6 may be executed in a different order and/or one or more groups of stages may be executed simultaneously. FIG. 3 illustrates a general schematic of the system architecture in accordance with an embodiment of the presently disclosed subject matter. Each module in FIG. 3 can be made up of any combination of software, hardware and/or firmware that performs the functions as defined and explained herein. The modules in FIG. 3 may be centralized in one location or dispersed over more than one location. In other embodiments of the presently disclosed subject matter, the system may comprise fewer, more, and/or different modules than those shown in FIG. 3.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Figure 1:
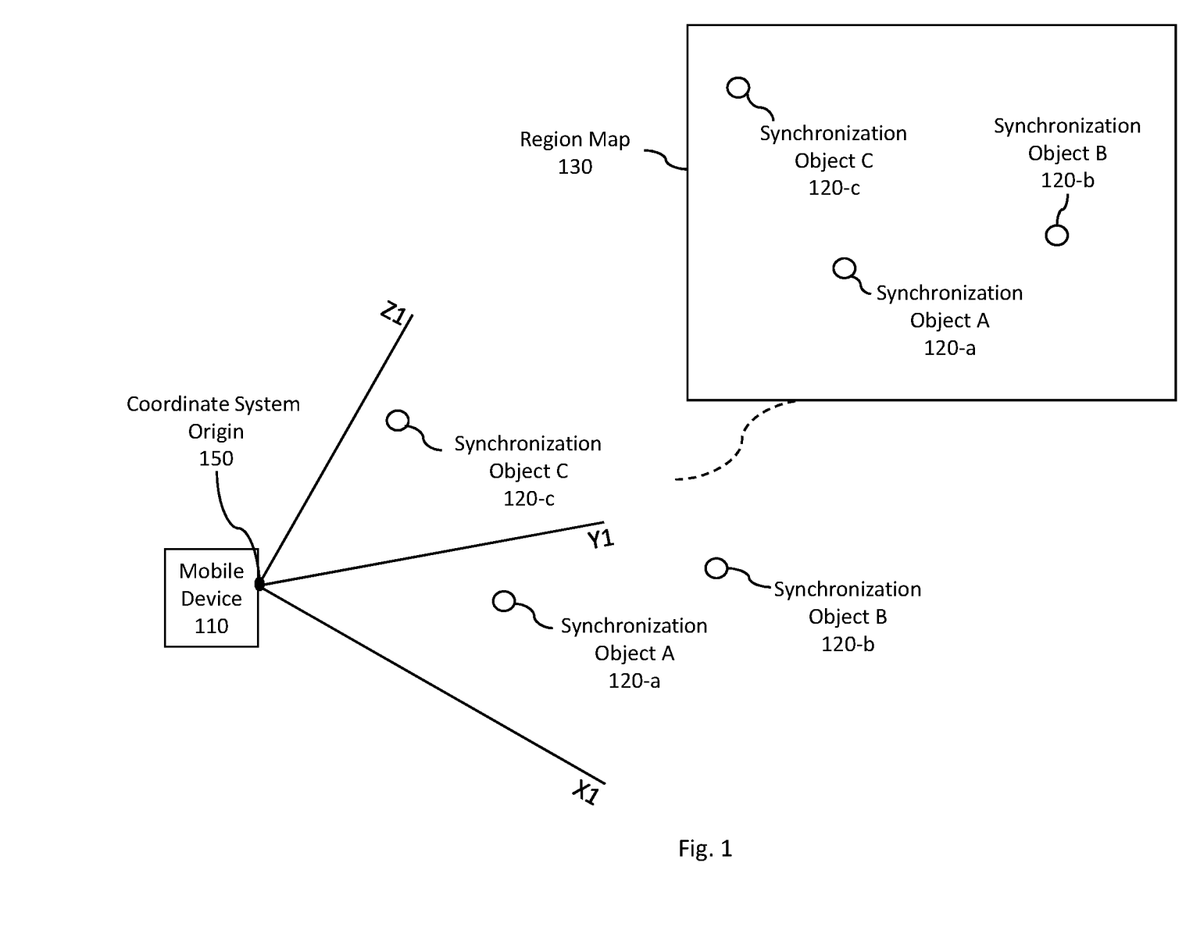
FIG. 1 is a schematic illustration of a region map generated by a device, in accordance with the presently disclosed subject matter.

Bearing this in mind, attention is drawn to FIG. 1, showing a schematic illustration of a region map generated by a device, in accordance with the presently disclosed subject matter.

In the illustration, a mobile device 110 is shown. Mobile device 110 can be, for example, a mobile phone, a laptop, a tablet, a smart watch, augmented reality glasses (such as google glass, Oculus, HoloLens, and others) or any other mobile device having data processing capabilities and the ability to physically move in space.

It is to be noted that although reference is made herein to a mobile device 110 that can be physically moved in space, in some cases, at least one of the devices in accordance with the presently disclosed subject matter can be stationary (i.e. have a fixed location in space), mutatis mutandis. Some exemplary such stationary devices include desktop computers, smart television sets, game consoles, etc.

Mobile device 110 has its own local coordinate system. Mobile device 110 local coordinate system is represented in the illustration by lines X1, Y1 and Z1. The local coordinate system of mobile device 110 has its own local coordinate system origin, namely coordinate system origin 150 (where X1, Y1 and Z1 intersect).

It is to be noted that when reference is made to coordinate system, it can refer to a coordinate with three degrees of freedom (e.g. x, y, z), or to a coordinate system with more than three degrees of freedom (also including at least one of pitch, roll, yaw and optionally a metric scale). In some cases, at least some of the degrees of freedom can be solved/reduced using knowledge of the mobile devices angle with respect to north, and the direction of gravity (that can be determined, for example, using standard sensors comprised within the mobile devices).

Coordinate system origin 150 is determined by the mobile device 110. In some cases, the mobile device 110 can determine the coordinate system origin 150 using data obtained from external sources, such as Global Positioning System (GPS) coordinates obtained by a GPS receiver of the mobile device 110 that is capable of receiving information from GPS satellites and calculating the mobile device's 110 geographical position on earth (i.e. its GPS coordinates). However, in some cases, e.g. when GPS coordinates cannot be determined (e.g. when the GPS receiver cannot detect signals and/or the signals are of poor quality), the mobile device 110 can determine the coordinate system origin 150 using less accurate method, such as triangulation (where multiple cell towers are used to track the mobile device 110 location by measuring the time delay that a signal takes to return back to the towers from the mobile device 110, where the delay is used to calculate the distances of the mobile device 110 from the cell towers, which enable providing a fairly accurate location of the mobile device 110). It is to be noted that other methods and/or techniques can be used to localize the mobile device 110 on earth coordinates. It is to be further noted that even GPS coordinates have an error (i.e. they are not accurate).

Mobile device 110 can map a region. For this purpose, it can be configured to identify objects (e.g. furniture, cars, people, electronic devices, trees, buildings, or any other physical object that can be identified by the human eyes and/or by any suitable electronic sensor) in its field of view and determine such objects position with respect to its coordinate system origin 150 (and therefore, the objects approximate position in earth coordinates). The determination of the position of the objects can be performed using various known and/or proprietary methods and/or techniques, including image analysis, range finders, etc., while also considering the movements of the mobile device 110 during the mapping of the region. It is to be noted that in many cases, the position determination is not accurate, and the same objects can be positioned differently by different devices, even from the same point of view and for the same coordinate system origin, as will be further detailed with reference to FIG. 2.

In the illustration shown in FIG. 1, the mobile device 110 generates a region map 130 of a certain region (e.g. a room, a playground, or any other geographical area viewed by the mobile device 110 when generating the region map). The region mapped by the generated region map 130 includes three objects that are used as "synchronization objects", being objects that are used as detailed herein to determine an approximate transformation between coordinate systems of different region maps. The synchronization objects shown include synchronization object A 120-*a*, synchronization object B 120-*b*, and synchronization object C 120-*c*, while each of the three synchronization objects has its own coordinates relative to the coordinate system origin 150 determined by the mobile device 110. As can be appreciated, the three synchronization objects are mapped as part of the region map 130, in accordance with the determination of their position by the mobile device 110.

It is to be noted that the illustration shown in FIG. 1 relates to region map 130 of a corresponding region that is generated by a given mobile device, namely mobile device 110. However, different mobile devices can map the same region (or a region that at least partially overlaps the region mapped by region map 130) differently, due to the fact that each mobile device 110 determines its own coordinate system origin 150, and determines the positions of the synchronization objects, in an imperfect manner (so that there are inaccuracies in the coordinate system origin determination and/or in the determination of the positions of the synchronization objects).

Figure 2:
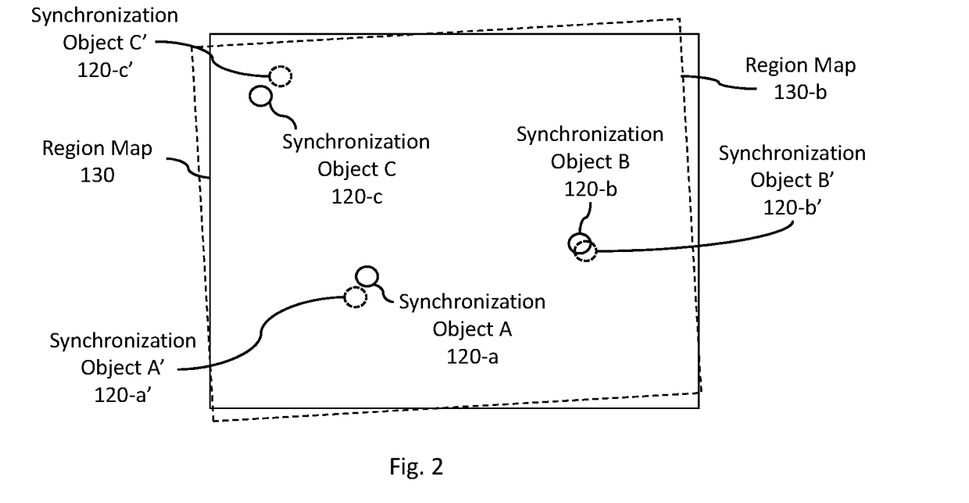
FIG. 2 is a schematic illustration of two region maps mapping an overlapping region, generated by two different devices, in accordance with the presently disclosed subject matter.

In order to further exemplify the inaccuracies, and the mismatches between regions maps of regions that include the same synchronization objects, attention is drawn to FIG. 2, showing a schematic illustration of two region maps mapping an overlapping region, generated by two different devices, in accordance with the presently disclosed subject matter.

In the illustration, two region maps are shown, namely region map 130 (generated by mobile device 110), and another region map 130-*b* generated by another mobile device, other than mobile device 110, or by the same mobile device 110 at another time, other than the time at which it mapped region map 130. Both region map 130 and region map 130-*b* map an overlapping region including the same three synchronization objects, namely synchronization object A 120-*a*, synchronization object B 120-*b*, and synchronization object C 120-*c*. However, as can be appreciated, each of the region maps 130 and 130-*b* has a different coordinate system origin, and both position the same synchronization objects at different positions (e.g. earth coordinates).

For example, synchronization object A 120-*a* and synchronization object A' 120-*a'* are actually the same object, mapped by the region maps 130 and 130-*b* respectively—but they are not located at the same global geographical location (e.g. their earth coordinates are not identical). In some cases, the differences can be small, e.g. less than one centimeter, and in other cases, the difference can be large, e.g. over ten meters. This of course results in an inability to determine what are the actual earth coordinates of the synchronization objects.

In order to deal with this inability, and to improve the accuracy of the localization of the synchronization objects (or any other object mapped by the region maps), and therefore the accuracy of the localization of the region maps themselves (in earth coordinates), usage can be made of a plurality of region maps that map the same synchronization objects, obtained over time from a plurality of mobile devices. As further detailed herein, once a given region map can be compared to other, previously obtained, region maps mapping synchronization objects that are included in the given region map, a transformation between the coordinate system of the given region map and the other region maps can be determined. Using the transformation information, the coordinates of the synchronization objects within the given map can also be reevaluated based on their respective coordinates as indicated by the other region maps. A more elaborate explanation is provided herein, with reference to FIGS. 4-6.

In light of the fact that in some cases the determination of the positions of synchronization objects (or any other objects) is based also on a determination of the mobile device 110 position and orientation, which in turn can be based on information obtained from motion sensors of the mobile device 110 (e.g. accelerometers and/or gyros), and due to the fact that such motion sensors are inaccurate, and their inaccuracy grows as a function of the distance traveled by the mobile device 110 (also referred to as a drift), mapping a large area may result in substantial inaccuracies, that are expected to increase as the movements of the mobile device 110 increase. Therefore, in some cases, every time the mobile device 110 travels a distance that exceeds a threshold during a single continuous session (in which the mobile device 110 is generating region map/s), it can be configured to reset its coordinate system origin 150, and continue to generate a new region map, having an origin at the new coordinate system origin of the mobile device 110. Any region map generated during a single session is thus associated with its own coordinate system origin, and the relations between the coordinate systems origins can be stored for later use.

As indicated herein, it is desirable to enable determination of an approximate transformation between the coordinate systems of the region maps. Such transformation can be determined using information of a spatial disposition of one or more synchronization objects with respect to coordinate system origins of the respective region maps. The synchronization objects are identifiable objects within the region maps generated by respective mobile devices (utilizing an image acquisition device, such as a camera that can capture images and/or a video stream comprised of a plurality of images, or any other sensor that can generate an image, or a mapping, of a scenery, including LIDAR, radar, range scanner, sonar, beacon, etc.).

In the non-limiting illustrated example, three synchronization objects are shown: synchronization object A 120-a (which is the same synchronization object as synchronization object A' 120-a'), synchronization object B 120-b (which is the same synchronization object as synchronization object B' 120-b'), and synchronization object C 120-c (which is the same synchronization object as synchronization object C' 120-c'). Each of the synchronization objects has a first corresponding coordinate in the first region map 130, and a second corresponding coordinate in the second region map 130-b.

It is to be noted that the first coordinates can be estimated by mobile device 110, and the second coordinates can be estimated by another mobile device, other than mobile device 110, or by mobile device 110 at another time (later than the time the first coordinates were determined), e.g. using various known methods and/or techniques, or using proprietary algorithms. Some exemplary such methods and/or techniques include comparing a known size of the synchronization object with its size on the image plane of the image acquired by the mobile device 110 or by the other mobile device. In other cases, where the size of the synchronization object is unknown, it can be estimated utilizing knowledge of similar objects (i.e. if the synchronization object is a glass, its size can be estimated using knowledge of sizes of glasses, etc.). Another alternative is to use triangulation of interest points (also referred to as image features) by tracking the points over time or over subsequent images (e.g. by matching similar points to previously seen points, or by an optical flow algorithm). As another alternative, Simultaneous Localization and Mapping (SLAM) methods may be used. As a further alternative, disparity maps between two images may be used.

The information of the coordinates of the synchronization objects can be used to determine an approximate transformation between the coordinate systems of the region maps. The approximate transformation can be determined using an optimization scheme such as: non-linear regression, non-linear least squares optimization, non-linear programming, Bayesian estimation, linear quadratic estimation, etc. The optimization scheme can obtain, as inputs, the coordinates of the synchronization objects in the coordinates system of the different region maps. The optimization scheme can attempt to identify, using the coordinates of the synchronization objects in both coordinate systems, an optimal transformation between the coordinate systems, optionally given one or more constraints (e.g. calculation time, number of iterations, etc.), as further detailed herein, inter alia with reference to FIGS. 4 and 5.

A simple example, provided for ease of understanding, is as follows: O1 and O2 are the origins of coordinate systems of two region maps. sA, sB, sC are three synchronization objects having the following coordinates in the coordinate systems having an origin at O1 and at O2:

sA=(1,0,1) in O1; (9,0,9) in O2
sB=(8,0,2) in O1; (2,0,8) in O2
sC=(4,0,6) in O1; (6,0,4) in O2

After calculation, the estimation of the transformation between the coordinate systems of the first region map and the second region map is:

R=(0, pi, 0) {i.e. pi degrees in the y axis, R stands for "Rotation" in radians}
C=(10, 0, 10) {i.e. 10 meters in X axis and 10 meters in Z axis of the coordinate systems, C stands for "Center" in meters}

In light of the fact that the transformation is determined using estimations of the coordinates of the synchronization objects in each of the coordinate systems, the transformation is an estimated transformation, that may have errors. Therefore, in some cases, the transformation is optimized over time, as more and more information is provided about the estimated coordinates of the synchronization objects (and optionally of newly identified synchronization objects) in more and more region maps. A further explanation is provided herein, inter alia with reference to FIG. 5.

Turning to FIG. 3, there is shown a block diagram schematically illustrating one example of a system for generating a collection of approximately coordinated region maps, in accordance with the presently disclosed subject matter.

According to certain examples of the presently disclosed subject matter, system 200 can comprise a network interface 260 enabling sending/receiving data, including sending/receiving information from devices (mobile devices such as mobile device 100, or any other device, mobile or stationary), such as region maps, etc.

System 200 can further comprise, or be otherwise associated with, a data repository 220 (e.g. a database, a storage system, a memory including Read Only Memory—ROM, Random Access Memory—RAM, or any other type of memory, etc.) configured to store data, including inter alia one or more region maps, approximate transformations between region maps, etc. Data repository 220 can be further configured to enable retrieval and/or update and/or deletion of the stored data. It is to be noted that in some cases, data repository 220 can be distributed, while the system 200 has access to the information stored thereon, e.g. via a network to which it connects through the network interface 260.

System 200 further comprises one or more processing resources 230. Processing resource 230 can be one or more processing units (e.g. central processing units), microprocessors, microcontrollers or any other computing devices or modules, including multiple and/or parallel and/or distributed processing units, which are adapted to independently or cooperatively process data for controlling relevant resources of the system 200 and for enabling operations related to resources of the system 200.

The processing resource 230 can comprise one or more of the following modules: region maps coordination module 240, region maps coordination optimization module 250, objects repositioning module 270 and region maps merge module 280.

According to some examples of the presently disclosed subject matter, region maps coordination module 240 can be configured to perform a region maps coordination process, as further detailed herein, inter alia with respect to FIG. 4.

Region maps coordination optimization module 250 can be configured to perform region maps coordination optimization process, as further detailed herein, inter alia with respect to FIG. 5.

Objects repositioning module 270 can be configured to reposition one or more synchronization object on one or more region maps, as further detailed herein, inter alia with reference to FIG. 4.

Region maps merge module 280 can be configured to perform a region maps merging process, as further detailed herein, inter alia with reference to FIG. 6.

It is to be noted that system 200 can be a mobile device, such as mobile device 110 (or a collection of mobile devices) or any other computerized device having suitable processing capabilities (e.g. one or more servers, desktop computers, laptop computers, etc.), or any combination therebetween.

Attention is drawn to FIG. 4, a flowchart illustrating one example of a sequence of operations carried out for determining an approximate transformation between a coordinate system of a given region map and coordinate systems of other region maps, in accordance with the presently disclosed subject matter.

According to certain examples of the presently disclosed subject matter, system 200 can be configured to perform a region maps coordination process 300, e.g. utilizing region maps coordination module 240.

For this purpose, system 200 can be configured to provide a data repository 220 comprising one or more region maps (block 310). Each of the region maps within the data repository map a corresponding region, and each of the region maps includes information of a relative location of one or more synchronization objects located within the corresponding region with respect to a coordinate-system origin of a coordinate system of the corresponding region map.

Data repository 220 can be generated by the system 200, optionally over time. The data repository 220 can include a plurality of region maps, each generated by a corresponding mobile device. Upon each mobile device generating a region map, it can send it for storage on the data repository 220. This data repository 220 is accessible by the system 200 (whether it is comprised within system 200, or if it is made available thereto in any other manner, including over a network connection).

A synchronization object can be, for example, one, or a combination of two or more, of the following:
  (a) a collection of objects having a first spatial relationship therebetween;
  (b) a pattern;
  (c) a three-vector point in a three-dimensional space;
  (d) a Global Positioning System (GPS) measurement;
  (e) a point cloud;
  (f) a semantically identified object;
  (g) a plane;
  (h) a collection of at least two planes having a second spatial relationship therebetween;
  (i) a uniquely identifiable object;
  (j) a uniquely identifiable image;
  (k) a uniquely identifiable synchronization object received from an external third party or from an operating system of a user device; and
  (l) a projection of feature points onto a sphere and/or a cube positioned in a spatial location in the region map.

System 200 further obtains a given region map of a given region (block 320). The given region map obtained at block 320 includes information of relative locations of one or more given synchronization objects located within the given region with respect to a given coordinate-system origin of a given coordinate system of the given region map.

System 200 further retrieves, from the data repository 220, one or more reference region maps of the region maps stored thereon that meet a criteria (block 330). The criteria can be:
  (a) That at least a partial overlap exists between the reference region maps and the given region map;
  (b) That the reference region maps are associated with geographical data that is indicative that at least one coordinate covered by the reference region maps is within a threshold distance of at least one coordinate covered by the given region map; and
  (c) That the reference region maps are generated by a user device (e.g. a mobile device, such as mobile device 110) of at least one user located within a second threshold distance of another user device, wherein the other user device generated the given region map.

Out of the retrieved reference region maps, system 200 can be configured to identify the reference region maps associated with at least one synchronization object that match to at least one of the given synchronization objects associated with the given region map obtained at block 320, giving rise to optimization region maps (block 340).

In some cases, the at least one synchronization object is determined to match the at least one of the given synchronization objects upon uniquely identifying that the at least one synchronization object and the at least one of the given synchronization objects are a same object having a common unique identifier. In other cases, the at least one synchronization object is determined to match the at least one of the given synchronization objects upon a likelihood of the at least one synchronization object matching the at least one of the given synchronization objects is above a threshold.

The optimization region maps are then used by the system 200 to determine, by employing an optimization scheme, utilizing the information of the relative location of the synchronization objects of the optimization region maps and the information of the relative locations of the given synchronization objects associated with the given region map, an approximate transformation between the given coordinate-system of the given region map obtained at block 320 and the coordinate-systems of the optimization region maps (block 350).

In some cases, the optimization scheme is based on one or more of the following:
  (a) Non-linear regression;
  (b) Non-linear Least Squares Optimization;
  (c) Non-linear programming;
  (d) Bayesian estimation; and
  (e) Linear quadratic estimation.

It is to be noted that in some cases, upon any one of the synchronization objects being semantically identified as being of a given type, the system 200 can be configured to delete it from the data repository 220. For example, upon a synchronization object being identified as a person, or as a specific person, the system 200 can delete it, for example in order to comply with various privacy requirements.

It is to be further noted that in some cases, the given region map is one of a plurality of session region maps generated during a session, wherein each of the session region maps is associated with a distinct session region map coordinate-system origin, thereby enabling determining a second transformation between the respective session region map's coordinate system and the coordinate-systems of the respective session region map's respective optimization region maps.

It is to be still further noted that in some cases at least part of the region maps coordination process 300 can be executed by processing resources of a user device (e.g. mobile device 110). In such cases, the given region map can be generated using information obtained by the user's device, or it can be retrieved from another user's device or from the data repository 220. In additional or alternative cases, at least part of the region maps coordination process 300 can be executed by processing resources of a server. In such cases, the given region map can be retrieved from the data repository 220.

In some cases, system 200 can be further configured to reposition, utilizing the approximate transformation determined at block 350, at least one of the synchronization objects of the optimization region maps based on a position of its corresponding given synchronization object as indicated by the given region map, and/or reposition at least one of the given synchronization objects as indicated by the given region map based on a position of its corresponding synchronization objects as indicated by the optimization region maps (block 360). The repositioning of block 360 can optionally be performed utilizing the objects repositioning module 270.

In some cases, one or more of the synchronization objects and one or more of the given synchronization objects are associated with respective movability scores indicative of a likelihood of a change in the spatial disposition of the respective given synchronization object and the respective synchronization objects, over time. In such cases, the repositioning of block 360 is based on the movability scores, e.g. so that for objects that are more likely to move over time, the weight of their position in less recently generated region maps is lower than the weight of their position in more recently generated region maps. In order to exemplify this matter, assuming two synchronization objects are provided, one being a chair, and another being a television set hanged on a wall. Clearly a chair is more likely to move over time than a television hanged on the wall. Therefore, assuming that a given region map generated at a certain time indicates that the chair is positioned at position X, and that another region map generated at later time, later than the given time, indicates that the chair is positioned at position Y, the correct position of the chair is more likely to be closer to Y than to X. However, if two or more region maps indicate that the television that is hanged on the wall is positioned at position X and a subsequently generated region map indicates that the television that is hanged on the wall is positioned at position Y, the correct position of the television is more likely to be closer to X than to Y.

In some cases, one or more of the synchronization objects and one or more of the given synchronization objects are associated with respective accuracy scores indicative of a presumed accuracy of the spatial disposition of the respective given synchronization objects and the respective synchronization objects. In such cases, the repositioning is based on the accuracy scores, so that higher the accuracy score of the synchronization object or given synchronization object is, the higher its weight is in determining its repositioning. For example, assuming that a given region map is generated by a certain mobile device that is known to be less accurate than another mobile device, and assuming that a given region map generated by the given mobile device indicates that a certain synchronization object is located at position X and that another region map generated by the other mobile device (the more accurate one) indicates that the certain synchronization object is located at position Y, it is more likely that the certain synchronization object is indeed located at position Y. Therefore, suitable weights can be assigned to different synchronization objects, based on an estimated accuracy of their positioning as indicated by the corresponding region map.

It is to be noted that in some cases, the given region map can include information about virtual anchors generated by one or more users of the system. The virtual anchors include information about virtual content registered by the users. The virtual anchors can be stored on the data repository 220 for various purposes. For example, assuming that a user wants to place a virtual chair in position X relative to the coordinate system origin of the mobile device. The user can publish an identification of a virtual chair's content (e.g., an ID, a Universally Unique Identifier (UUID), a hash of the binary representation of the three-dimensional chair model, the content itself, and so on) with the position X on the data repository 220. In subsequent runs of the system, by that user or others, once the region map has been positioned, the system could load the virtual chair's identification from the data repository 220, followed by locating and loading the virtual content itself, as applicable, and then drawing the chair in the then correct position (e.g. Y). The chair will be seen as placed in the same physical world location to any user/session.

It is to be noted that, with reference to FIG. 4, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

Turning to FIG. 5, there is shown a flowchart illustrating one example of a sequence of operations carried out for re-determining an approximate transformation between a coordinate system of a given region map and coordinate systems of other region maps, in accordance with the presently disclosed subject matter.

According to certain examples of the presently disclosed subject matter, system 200 can be configured to perform a region maps coordination optimization process 400, e.g. utilizing region maps coordination optimization process module 250.

For this purpose, system 200 can be configured to update the given region map obtained at block 320 by adding information of relative locations of one or more additional synchronization objects located within the given region with respect to the given coordinate-system origin of the given coordinate system of the given region map (block 410). The information can be added upon identification of the additional synchronization objects by a user device generating the given region map and during its generation, or by a computerized device (e.g. such as mobile device 110, or a server, etc.), by analyzing information obtained from the user device that generated the given region map, during, or after, its creation.

System 200 is further configured to identify the reference region maps associated with the at least one synchronization object of the synchronization objects that match to at least one of the additional synchronization objects, giving rise to additional optimization region maps (block 420).

System 200 can then re-determine, by employing the optimization scheme of block 350 (or, optionally, another optimization scheme), utilizing the information of the relative location of the synchronization objects of the optimization region maps, the information of the relative locations of the given synchronization objects, and the information of relative locations of one or more additional synchronization objects, an optimized approximate transformation between the given coordinate-system and the coordinate-systems of the optimization region maps and the additional optimization region maps (block 430).

After the redetermination, the process can return to block 410. In some cases, before returning to block 410, the system 200 can repeat the repositioning of block 360, utilizing the optimized approximate transformation instead of the approximate transformation.

It is to be noted that, with reference to FIG. 5, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

FIG. 6 is a flowchart illustrating one example of a sequence of operations carried out for merging region maps, in accordance with the presently disclosed subject matter.

According to certain examples of the presently disclosed subject matter, system 200 can be configured to perform a region maps merge process 500, e.g. utilizing region maps merge module 280.

For this purpose, system 200 can be configured to determine a level of similarity between positions of the synchronization objects of selected region maps of the region maps (e.g. region maps that include information of locations of shared synchronization objects, being synchronization objects that are mapped by all selected region maps) (block 510).

Upon a determination that the level of similarity exceeds a threshold (e.g. that all of the selected region maps position the shared synchronization objects in positions that are almost identical, e.g. up to one centimeter apart, or up to any other pre-determined distance from each other), system 200 can merge the selected region maps into a merged region map (block 520).

It is to be noted that due to the repositioning of the synchronization objects of block 360, over time, and as more region maps are generated, the positions of synchronization objects are expected to converge, especially for those synchronization objects that are less likely to move.

Looking at the example provided in FIG. 2, there are shown two region maps (region map 130 and region map 130-b) with two different sets of coordinate systems origins. Therefore, each of the synchronization objects (synchronization object A 120-a which corresponds to synchronization object A' 120-a', synchronization object B 120-b which corresponds to synchronization object B' 120-b', and synchronization object C 120-c which corresponds to synchronization object C' 120-c') has two different positions.

Assuming that during execution of process 500, system 200 identifies that the relative differences between the positions of each of pair of positions of the synchronization objects (i.e. the positions of synchronization object A 120-a and synchronization object A' 120-a', the positions of synchronization object B 120-b and synchronization object B' 120-b', and the position of synchronization object C 120-c and synchronization object C' 120-c') is smaller than some threshold (1 cm). Therefore, both regions maps region map 130 and region map 130-b can be discarded and replaced with a new region map, that can be stored on the data repository 220. The new region map can be associated with its own coordinate system origin and can include three new synchronization objects (one that corresponds to synchronization object A 120-a and synchronization object A' 120-a', one that corresponds to synchronization object B 120-b and synchronization object B' 120-b', and one that corresponds to synchronization object C 120-c and synchronization object C' 120-c') can be positioned relative to this new coordinate system origin. In one example, the positions of the new synchronization objects could be the spatial average of the previous two respective positions. (i.e. new synchronization object A will be positioned in a position that is a spatial average of the position of synchronization object A 120-a and synchronization object A' 120-a', new synchronization object B will be positioned in a position that is a spatial average of the position of synchronization object B 120-b and synchronization object B' 120-b', and new synchronization object C will be positioned in a position that is a spatial average of the position of synchronization object C 120-c and synchronization object C' 120-c').

It is to be noted that, with reference to FIG. 6, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for generating a collection of approximately coordinated region maps, the system comprising one or more processing resources configured to perform the following process:
   (a) provide a data repository comprising a plurality of region maps, each of the region maps mapping a corresponding region, wherein each of the region maps includes information of a relative location of one or more synchronization objects located within the corresponding region with respect to a coordinate-system origin of a coordinate system of the corresponding region map;
   (b) obtain a given region map of a given region, the given region map includes second information of second relative locations of one or more given synchronization objects located within the given region with respect to a given coordinate-system origin of a given coordinate system of the given region map;
   (c) retrieve, from the data repository, one or more reference region maps of the region maps that meet a criteria;
   (d) identify the reference region maps associated with at least one first synchronization object of the synchronization objects that match to at least one of the given synchronization objects, giving rise to optimization region maps; and (e) determine, by employing an optimization scheme, utilizing the information of the relative location of the synchronization objects of the optimization region maps and the second information of the second relative locations of the given synchronization objects, an approximate transformation between the given coordinate-system and the coordinate-systems of the optimization region maps.

2. The system of claim 1, wherein at least one of the processing resources is further configured to repeatedly perform the following:

update the given region map by adding third information of third relative locations of one or more additional synchronization objects located within the given region with respect to the given coordinate-system origin of the given coordinate system of the given region map;

identify the reference region maps associated with the at least one first synchronization object of the synchronization objects that match to at least one of the additional synchronization objects, giving rise to additional optimization region maps; and re-determine, by employing the optimization scheme, utilizing the information of the relative location of the synchronization objects of the optimization region maps, the second information of the second relative locations of the given synchronization objects, and the third information of third relative locations of one or more additional synchronization objects, an optimized approximate transformation between the given coordinate-system and the coordinate-systems of the optimization region maps and the additional optimization region maps.

3. The system of claim 1, wherein the criteria is one or more of the following:

(a) at least a partial overlap exists between the reference region maps and the given region map;

(b) the reference region maps are associated with geographical data that is indicative that at least one first coordinate covered by the reference region maps is within a threshold distance of at least one second coordinate covered by the given region map; and (c) the reference region maps are generated by a user device of at least one user located within a second threshold distance of a second user device, wherein the second user device generated the given region map.

4. The system of claim 1, wherein the at least one first synchronization object is determined to match the at least one of the given synchronization objects (a) upon uniquely identifying that the at least one first synchronization object and the at least one of the given synchronization objects are a same object having a common unique identifier, or (b) upon a likelihood of the at least one first synchronization object matching the at least one of the given synchronization objects being above a threshold.

5. The system of claim 1, wherein the given region map is one of a plurality of session region maps generated during a session, wherein each of the session region maps is associated with a distinct session region map coordinate-system origin, thereby enabling determining a second transformation between the respective session region map's coordinate system and the coordinate-systems of the respective session region map's respective optimization region maps.

6. The system of claim 1, wherein at least one of the processing resources is a server processing resource, and wherein at least part of the process is performed by the server processing resource.

7. The system of claim 6, wherein one or more of the synchronization objects and one or more of the given synchronization objects are: (a) associated with respective movability scores, and wherein the repositioning is based on the movability scores, wherein the movability scores are indicative of a likelihood of a change in the spatial disposition of the respective given synchronization object and the respective synchronization objects, over time; or (b) associated with respective accuracy scores, and wherein the repositioning is based on the accuracy scores, wherein the accuracy scores are indicative of a presumed accuracy of the spatial disposition of the respective given synchronization objects and the respective synchronization objects.

8. The system of claim 6, wherein at least one of the processing resources is further configured to merge one or more selected region maps of the region maps into a merged region map upon a determination that a level of similarity between positions of the synchronization objects of the selected region maps exceeds a threshold.

9. The system of claim 1, wherein at least one of the processing resources is further configured to reposition, utilizing the approximate transformation, at least one of the synchronization objects of the optimization region maps based on a position of its corresponding given synchronization object, or reposition at least one of the given synchronization objects of the given region map based on a position of its corresponding synchronization object as indicated by the optimization region maps.

10. A method of generating a collection of approximately coordinated region maps, the method comprising performing the following process:

(a) providing a data repository comprising a plurality of region maps, each of the region maps mapping a corresponding region, wherein each of the region maps includes information of a relative location of one or more synchronization objects located within the corresponding region with respect to a coordinate-system origin of a coordinate system of the corresponding region map;

(b) obtaining, by one or more processing resources, a given region map of a given region, the given region map includes second information of second relative locations of one or more given synchronization objects located within the given region with respect to a given coordinate-system origin of a given coordinate system of the given region map;

(c) retrieving, by at least one of the processing resources, from the data repository, one or more reference region maps of the region maps that meet a criteria;

(d) identifying, by at least one of the processing resources, the reference region maps associated with at least one first synchronization object of the synchronization objects that match to at least one of the given synchronization objects, giving rise to optimization region maps; and (e) determining, by at least one of the processing resources, by employing an optimization scheme, utilizing the information of the relative location of the synchronization objects of the optimization region maps and the second information of the second relative locations of the given synchronization objects, an approximate transformation between the given coordinate-system and the coordinate-systems of the optimization region maps.

11. The method of claim 10, further comprising repeatedly performing the following:

updating, by at least one of the processing resources, the given region map by adding third information of third relative locations of one or more additional synchronization objects located within the given region with respect to the given coordinate-system origin of the given coordinate system of the given region map;

identifying, by at least one of the processing resources, the reference region maps associated with the at least one first synchronization object of the synchronization objects that match to at least one of the additional synchronization objects, giving rise to additional optimization region maps; and re-determining, by at least one of the processing resources, by employing the optimization scheme, utilizing the information of the relative location of the synchronization objects of the optimization region maps, the second information of the second relative locations of the given synchronization objects, and the third information of third relative locations of one or more additional synchronization objects, an optimized approximate transformation between the given coordinate-system and the coordinate-systems of the optimization region maps and the additional optimization region maps.

12. The method of claim 10, wherein the criteria is one or more of the following:
   (a) at least a partial overlap exists between the reference region maps and the given region map;
   (b) the reference region maps are associated with geographical data that is indicative that at least one first coordinate covered by the reference region maps is within a threshold distance of at least one second coordinate covered by the given region map; and
   (c) the reference region maps are generated by a user device of at least one user located within a second threshold distance of a second user device, wherein the second user device generated the given region map.

13. The method of claim 10, wherein the at least one first synchronization object is determined to match the at least one of the given synchronization objects (a) upon uniquely identifying that the at least one first synchronization object and the at least one of the given synchronization objects are a same object having a common unique identifier, or (b) upon a likelihood of the at least one first synchronization object matching the at least one of the given synchronization objects being above a threshold.

14. The method of claim 10, wherein the given region map is one of a plurality of session region maps generated during a session, wherein each of the session region maps is associated with a distinct session region map coordinate-system origin, thereby enabling determining a second transformation between the respective session region map's coordinate system and the coordinate-systems of the respective session region map's respective optimization region maps.

15. The method of claim 10, wherein at least one of the processing resources is a server processing resource, and wherein at least part of the process is performed by the server processing resource.

16. The method of claim 15, wherein one or more of the synchronization objects and one or more of the given synchronization objects are: (a) associated with respective movability scores, and wherein the repositioning is based on the movability scores, wherein the movability scores are indicative of a likelihood of a change in the spatial disposition of the respective given synchronization object and the respective synchronization objects, over time; or (b) associated with respective accuracy scores, and wherein the repositioning is based on the accuracy scores, wherein the accuracy scores are indicative of a presumed accuracy of the spatial disposition of the respective given synchronization objects and the respective synchronization objects.

17. The method of claim 15, further comprising merging, by at least one of the processing resources, one or more selected region maps of the region maps into a merged region map upon a determination that a level of similarity between positions of the synchronization objects of the selected region maps exceeds a threshold.

18. The method of claim 10, further comprising repositioning, by at least one of the processing resources, utilizing the approximate transformation, at least one of the synchronization objects of the optimization region maps based on a position of its corresponding given synchronization object, or reposition at least one of the given synchronization objects of the given region map based on a position of its corresponding synchronization object as indicated by the optimization region maps.

19. The method of claim 10, wherein the given region map includes information about virtual anchors generated by one or more users of the system.

20. A non-transitory computer readable storage medium having computer readable program code embodied therewith, the computer readable program code, executable by at least one processor of a computer to perform a method of generating a collection of approximately coordinated region maps, the method comprising performing the following process:
   (a) providing a data repository comprising a plurality of region maps, each of the region maps mapping a corresponding region, wherein each of the region maps includes information of a relative location of one or more synchronization objects located within the corresponding region with respect to a coordinate-system origin of a coordinate system of the corresponding region map;
   (b) obtaining, by one or more processing resources, a given region map of a given region, the given region map includes second information of second relative locations of one or more given synchronization objects located within the given region with respect to a given coordinate-system origin of a given coordinate system of the given region map;
   (c) retrieving, by at least one of the processing resources, from the data repository, one or more reference region maps of the region maps that meet a criteria;
   (d) identifying, by at least one of the processing resources, the reference region maps associated with at least one first synchronization object of the synchronization objects that match to at least one of the given synchronization objects, giving rise to optimization region maps; and
   (e) determining, by at least one of the processing resources, by employing an optimization scheme, utilizing the information of the relative location of the synchronization objects of the optimization region maps and the second information of the second relative locations of the given synchronization objects, an approximate transformation between the given coordinate-system and the coordinate-systems of the optimization region maps.

* * * * *